United States Patent
Kahkoska et al.

(10) Patent No.: US 10,917,311 B2
(45) Date of Patent: Feb. 9, 2021

(54) NETWORK TEST INSTRUMENT

(71) Applicant: NetAlly, LLC, Colorado Springs, CO (US)

(72) Inventors: James A. Kahkoska, Colorado Springs, CO (US); Donna Eastep, Colorado Springs, CO (US); Michael Walters, Colorado Springs, CO (US); Clay Jones, Colorado Springs, CO (US); Michael Morgan, Colorado Springs, CO (US)

(73) Assignee: NetAlly, LLC, Colorado Springs, CO (US)

( * ) Notice: Subject to any disclaimer, the term of this patent is extended or adjusted under 35 U.S.C. 154(b) by 230 days.

(21) Appl. No.: 15/602,310

(22) Filed: May 23, 2017

(65) Prior Publication Data
US 2017/0264502 A1 Sep. 14, 2017

Related U.S. Application Data

(63) Continuation of application No. 13/874,104, filed on Apr. 30, 2013, now abandoned.

(60) Provisional application No. 61/811,573, filed on Apr. 12, 2013.

(51) Int. Cl.
*H04L 12/24* (2006.01)
*H04L 12/26* (2006.01)

(52) U.S. Cl.
CPC .............. *H04L 41/22* (2013.01); *H04L 43/50* (2013.01)

(58) Field of Classification Search
CPC ........ G06F 3/0484; H04L 41/22; H04L 43/50
See application file for complete search history.

(56) References Cited

U.S. PATENT DOCUMENTS

| | | | |
|---|---|---|---|
| 6,609,152 B1 | 8/2003 | Ono | |
| 6,952,421 B1 | 10/2005 | Slater | |
| 7,278,104 B1 | 10/2007 | DeBruler et al. | |
| 7,370,236 B2 * | 5/2008 | Szucs | G06F 11/2294 714/25 |
| 8,437,790 B1 | 5/2013 | Hassan et al. | |
| 9,094,339 B2 * | 7/2015 | Karam | H04L 41/5067 |

(Continued)

OTHER PUBLICATIONS

Non-Final Office Action issued in related U.S. Appl. No. 13/874,104 dated Jul. 27, 2015.

(Continued)

*Primary Examiner* — Phenuel S Salomon
(74) *Attorney, Agent, or Firm* — Mark H. Whittenberger; Holland & Knight LLP (57) ABSTRACT

A method and apparatus (e.g., network test instrument) for presenting network device diagnostic information in which a listing of network devices discovered via a first network connection (e.g., wirelessly—802.11) to a test network is presented in a GUI of a network diagnostic instrument. Acquired network diagnostic information for a network device selected from the listing of network devices is then presented in the GUI wherein the presented network diagnostic information is acquired via the first network connection (e.g., wirelessly—802.11). Indication (and a link thereto) is provided in the GUI indicating network diagnostic information for the selected network device was also acquired via a second network connection to the test network (e.g., via a wired connection—802.3).

17 Claims, 5 Drawing Sheets

(56) References Cited

U.S. PATENT DOCUMENTS

| | | | |
|---|---|---|---|
| 9,479,341 B2* | 10/2016 | Bugenhagen | H04L 12/1403 |
| 2002/0075326 A1* | 6/2002 | Allen | H04L 43/00 |
| | | | 715/853 |
| 2002/0111924 A1* | 8/2002 | Lewis | G06Q 30/06 |
| | | | 705/413 |
| 2002/0144187 A1 | 10/2002 | Morgan et al. | |
| 2004/0255192 A1* | 12/2004 | Watanabe | H04L 41/06 |
| | | | 714/25 |
| 2006/0098589 A1 | 5/2006 | Kreeger et al. | |
| 2006/0203815 A1 | 9/2006 | Couillard | |
| 2007/0081549 A1* | 4/2007 | Cicchetti | H04L 12/40032 |
| | | | 370/447 |
| 2007/0150819 A1* | 6/2007 | Goodman | G06F 16/95 |
| | | | 715/749 |
| 2007/0211696 A1 | 9/2007 | Noble | |
| 2007/0211697 A1 | 9/2007 | Noble | |
| 2007/0233858 A1* | 10/2007 | Goff | H04L 41/0681 |
| | | | 709/224 |
| 2007/0240071 A1 | 10/2007 | Sherrill et al. | |
| 2009/0058857 A1* | 3/2009 | Ballantyne | H04L 41/5074 |
| | | | 345/440 |
| 2009/0059814 A1* | 3/2009 | Nixon | H04L 41/12 |
| | | | 370/254 |
| 2009/0113244 A1* | 4/2009 | Doshi | H04W 24/08 |
| | | | 714/25 |
| 2009/0210935 A1 | 8/2009 | Miley et al. | |
| 2010/0138750 A1 | 6/2010 | Trinler | |
| 2010/0187903 A1* | 7/2010 | Diab | B60R 16/023 |
| | | | 307/9.1 |
| 2011/0149720 A1 | 6/2011 | Phuah | |
| 2011/0265116 A1 | 10/2011 | Stern | |
| 2012/0079100 A1* | 3/2012 | McIntyre | H04W 24/00 |
| | | | 709/224 |
| 2012/0209934 A1* | 8/2012 | Smedman | H04L 12/5692 |
| | | | 709/208 |
| 2012/0210000 A1 | 8/2012 | Wood | |
| 2013/0019298 A1 | 1/2013 | Jover Segura | |
| 2013/0286864 A1* | 10/2013 | Karam | G01R 19/16566 |
| | | | 370/252 |
| 2014/0032746 A1* | 1/2014 | Saxena | H04L 43/04 |
| | | | 709/224 |
| 2014/0259074 A1* | 9/2014 | Ansari | H04N 21/482 |
| | | | 725/50 |
| 2016/0313776 A1* | 10/2016 | Robitaille | H04L 12/10 |

OTHER PUBLICATIONS

Non-Final Office Action issued in related U.S. Appl. No. 13/874,104 dated Jul. 28, 2016.
Final Office Action issued in related U.S. Appl. No. 13/874,104 dated Mar. 10, 2016.
Final Office Action issued in related U.S. Appl. No. 13/874,104 dated Nov. 16, 2016.
Notice of Allowance issued in related U.S. Appl. No. 13/874,104 dated Mar. 10, 2017.

* cited by examiner

NETWORK TEST INSTRUMENT

CROSS REFERENCE TO RELATED APPLICATIONS

This application is a Continuation of U.S. patent application Ser. No. 13/874,104, filed Apr. 30, 2013, which claims the benefit of and priority to U.S. Provisional Patent Application No. 61/811,573, filed Apr. 12, 2013, the content of which is expressly incorporated by reference herein in its entirety.

FIELD OF THE INVENTION

This invention relates to test instruments for testing of networks and devices, and particularly to testing network devices linked either via a wireless connection or both a wired and wireless connection to a network.

BACKGROUND OF THE INVENTION

Handheld and portable network testing instruments are becoming more ubiquitous in the computer networking industry. Such instruments can be configured as all-in-one Gigabit Ethernet troubleshooter for copper, fiber optic, and Wi-Fi networks. With relatively little training, these instruments enable a user to conduct network troubleshooting using standardized test scripts tailored for a user's network, services and applications.

It is noted that when testing wireless 802.11 networks with such test instruments, network traffic is usually encrypted and is practically undecipherable unless the cipher protocol uses a shared secret. It is further noted most medium-to-large enterprises have implemented security models that do not use a shared secret. This limits the amount of information that can be learned by network test instruments when identifying network devices via 802.11 network traffic to layer 1 and layer 2 information in the ISO/IEC 7498-1 Open Systems Interconnection model, e.g. signal strength, associated Service Set Identification (SSID), Basic SSID (BSSID), linked Access Point (AP), etc.

It is known that by adding device discovery and identification at layer 3 on a 802.3 network where network traffic is usually unencrypted and by graphical linking the 802.11 discovery and the 802.3 discovery presentations in the Graphical User Interface (GUI), a network test instrument can learn and report additional device information, including IP v4 and/or IPv6 addresses, device name, i.e. DNS, NETBIOS and/or SNMP.

However, while existing test instruments, such as the OneTouch™ AT product provided by common assignee Fluke Networks® supported both 802.11 discovery and 802.3 discovery, such test instruments provided no indication that a network device was identified through both wireless and wired discovery systems.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method and apparatus (e.g., network test instrument) for presenting network device diagnostic information is described in which a listing of network devices discovered via a first network linking (e.g., wirelessly—802.11) to a test network is presented in a GUI of a network diagnostic instrument. Acquired network diagnostic information for a network device selected from the listing of network devices is then presented in the GUI wherein the presented network diagnostic information is acquired via the first network connection (e.g., wirelessly—802.11). Indication (and a link thereto) is also provided in the GUI indicating network diagnostic information for the selected network device was also acquired via a second network connection to the test network (e.g., via a wired connection—802.3). Upon selection of the indication that information for the selected network device was also acquired via a second network connection to the test network, acquired network diagnostic information via the second network connection (e.g., a wired connection—802.3) for the network device is presented in the GUI.

In further, optional aspects, a graphical user interface for a test instrument is described. The graphical user interface preferably having a touchscreen interface. A listing of network devices on the graphical user interface is provided with indication that each network device has network device diagnostic information acquired via a first network connection to the network device. An indicator on the graphical display is also displayed when network device diagnostic information for a selected network device was also acquired via a second network connection to the network device wherein the first network connection is one of a wired and wireless connection to the network device and the second network connection is the other one of the wired and wireless connections to the network device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

Figure 2A:
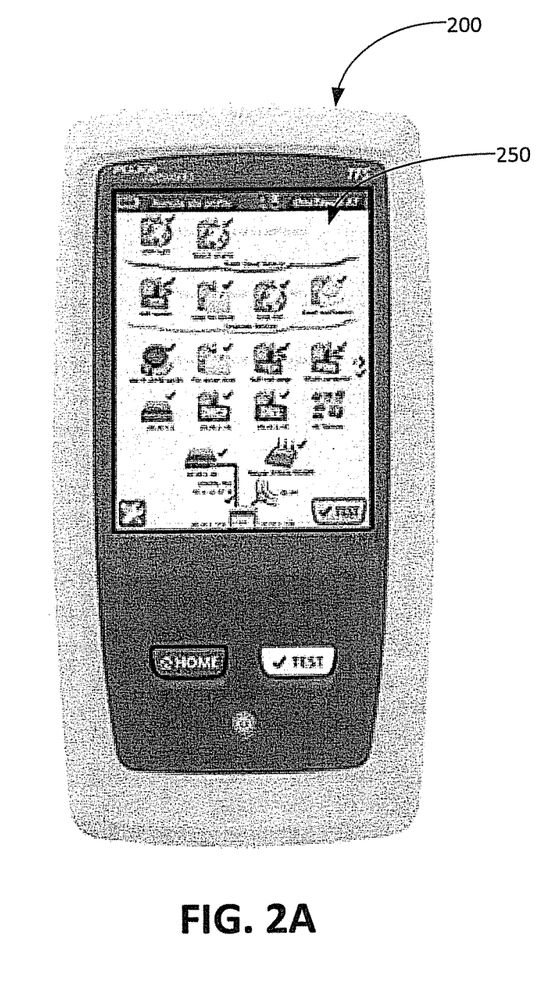
FIG. 2A depicts an illustrated embodiment of a test instrument used in the system of FIG. 1.
Figure 3A:
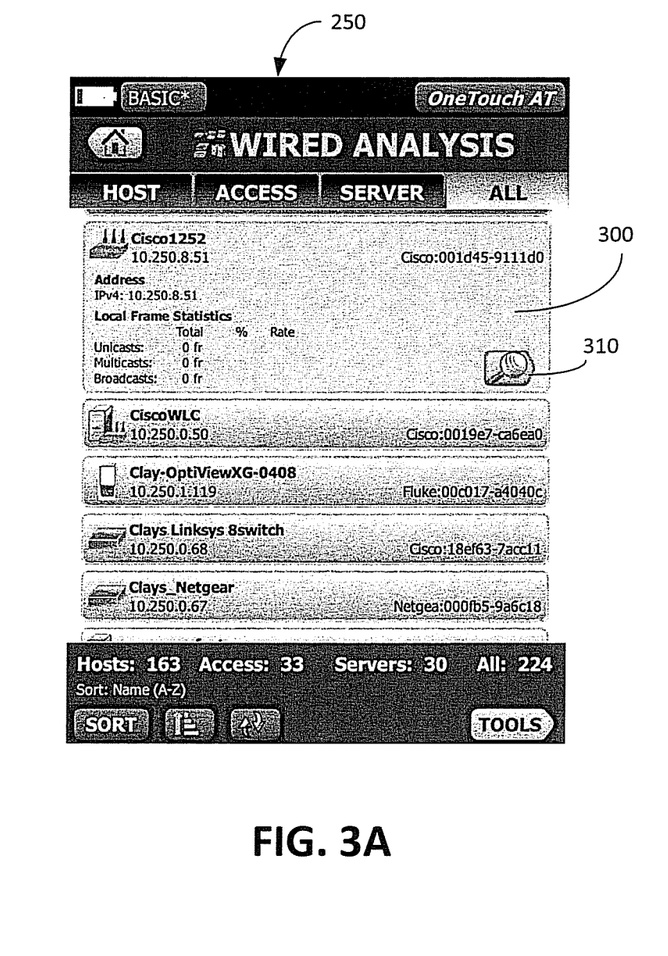
FIGS. 3A and 3B depict screens shots of the test instrument used in the system of FIG. 1.
Figure 3B:
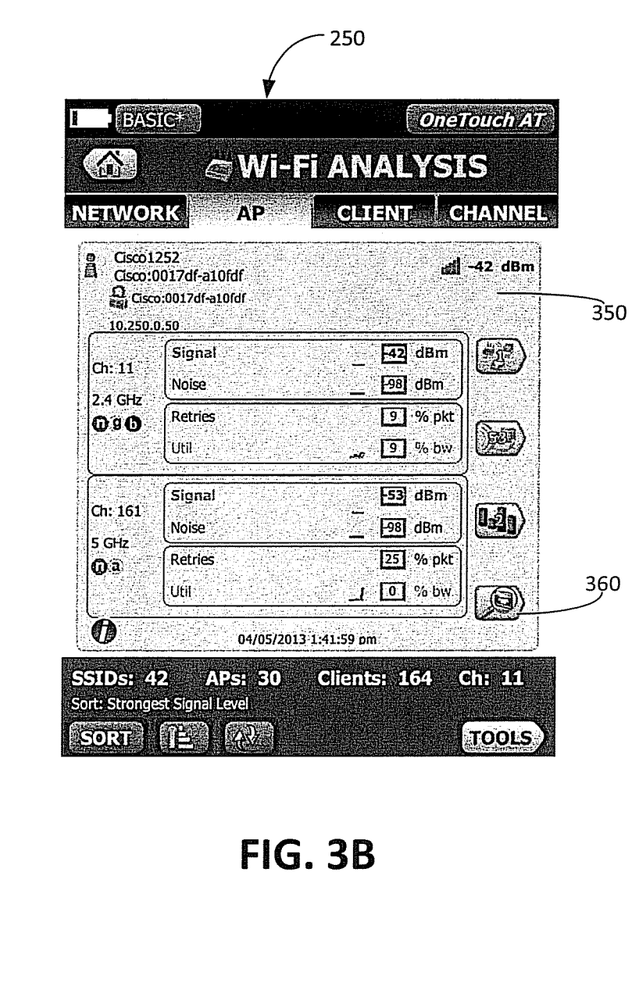

As to be described further below with reference to FIGS. 1-4, the invention according to an illustrated embodiment in one aspect generally relates to a network test instrument (200, FIGS. 1 and 2A), method of operation (400, FIG. 4), and graphical interface (250, FIG. 2A) such that when the network test instrument 200 through both wireless discovery 30 (e.g., via 802.11) and wired discovery 32 (e.g., via 802.3) methods detect a network device (10, FIG. 1) in a test network 100, a user, via GUI 250, selects the device 10 from a summary device list presented in a GUI 250 preferably categorized either by a wired analysis listing (300, FIG. 3A) or a wireless (Wi-Fi) analysis user interface (350, FIG. 3B). The network test instrument 200 being adapted and configured to query both a wired analysis database 260 and a Wi-Fi analysis database 270 for the existence of an entry that preferably corresponds to a MAC address associated with the selected device 10. If the device MAC address (e.g., the device 10) is found in both databases 260, 270, a cross link navigation symbol/button 310 is presented in the GUI 250. Selecting the cross link navigation symbol/button (310, FIG. 3A) terminates the current UI window regarding, for instance, wired details (window 300 on GUI 250) so as to display device details (window 350 on GUI 250) for the selected device 10 for the complementary wireless network type.

Figure 1:
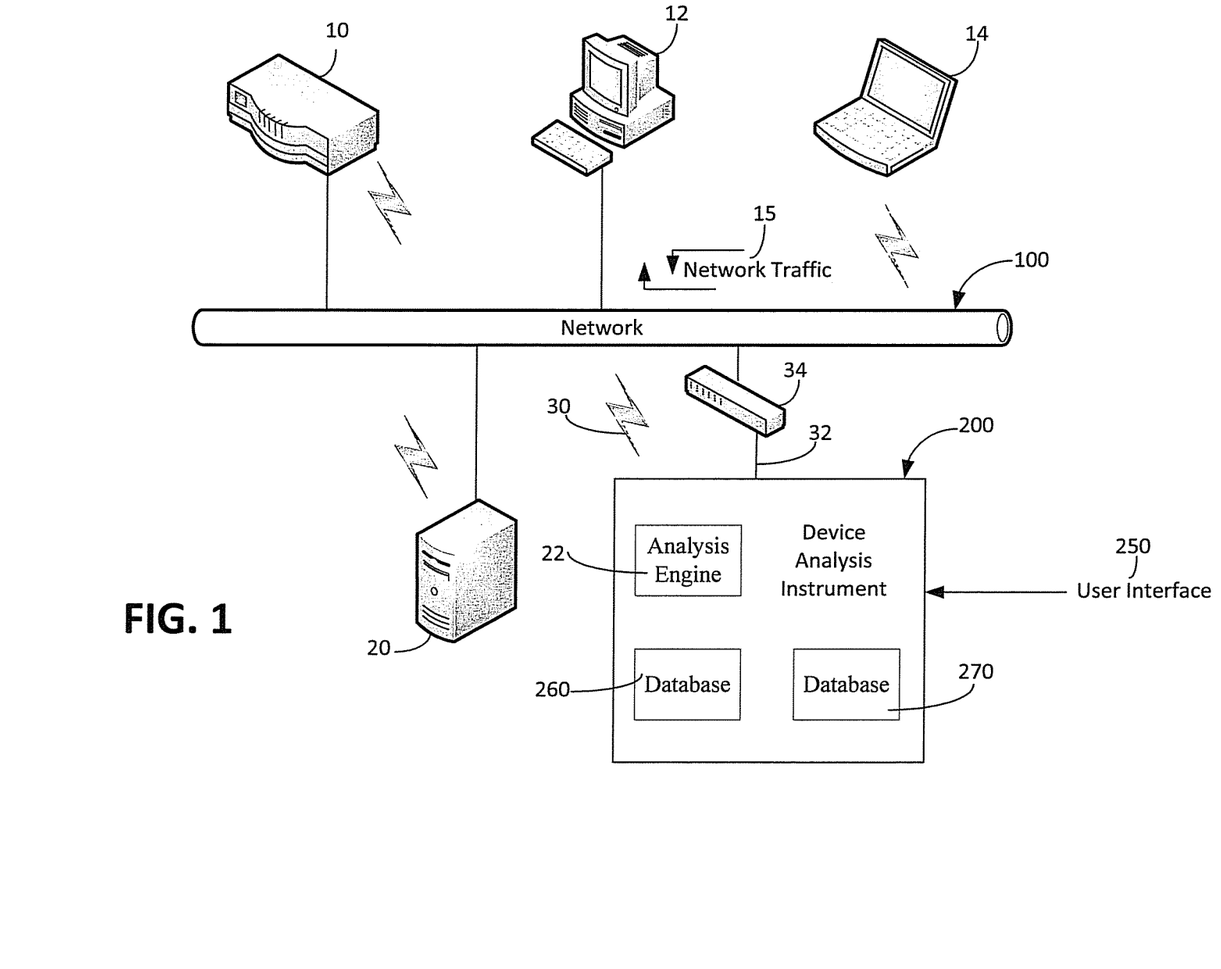
FIG. 1 illustrates a system overview in accordance with an illustrated embodiment.

With reference now to FIG. 1, an illustrated embodiment is shown in which network test device 200 detects and acquires diagnostic information of a plurality of network devices 10, 12, 14 coupled to a network (e.g., a Local Area Network LAN) 100. It is to be understood and appreciated network 100 may be wirelessly (via preferably a 802.11 link) and/or wired (via preferably a 802.3 link) connected to plural network devices 10, 12, 14, etc., which communicate over a network 100 by preferably sending and receiving network traffic 15 preferably via interaction with server 20 or other networking components thereof. The traffic 15 may be sent in packet form, with varying protocols and formatting thereof. Examples of the network devices 10, 12, 14, etc., include (and are not limited to) multiple network devices such as routers, switches, hubs, servers, client computers (e.g., desktop PCs, laptops, workstations), and peripheral devices networked together across a network 100 such as for instance a local area network (LAN) and/or a wide area network (WAN). In such networks, data is typically exchanged between a requesting device, such as a client 10, and a responding device, such as a server 20.

A network test instrument 200 connects to the network 100 via both wirelessly 30 (e.g., via preferably 802.11 techniques) and via a wired connection 32 (e.g., via preferably 802.3 techniques). It is noted, network test instrument 200 in an illustrated embodiment wirelessly connects 30 via a Wi-Fi connection used by network 100, and establishes a wired connection 23 to network 100 via preferably a shared hub 34 or like switch component type connected in network 100. In regards to wirelessly acquiring Basic Service Set Identification (BSSID) for determining a MAC address for the network devices (10, 12, 14, etc.), it is to be understood and appreciated test instrument 200 in accordance with an illustrated embodiment may use a first process in which the test instrument 100 uses ARP and PING sweeps with network 100 to acquire AP MAC and BSSID network device information. Test instrument 200 may additionally use a second process in which test instrument 200 utilizes SNMP BSSID queries with network 100 to acquire AP BSSID network device information. Thus, it is to be understood, network test instrument 200 is adapted and configured, through both wireless discovery 30 (e.g., via 802.11) and wired discovery 32 (e.g., via 802.3) methods, to detect and acquire diagnostic device information from network devices 10, 12, 14, etc., coupled either wirelessly or by wire to test network 100. It is to be further appreciated network device Layer 1 and 2 information is preferably acquired via a wireless connection (e.g., 802.11) and network device Layer 2 and 3 information is preferably acquired via a wired connection (e.g., 802.3). Layer 1 and 2 information acquired via a 802.11 connection typically includes information relating to: signal strength; associated Service Set Identification (SSID); Basic SSID (BSSID); and linked Access Point (AP), etc. Layer 2 and 3 information acquired via an 802.3 connection typically includes information relating to MAC addresses, IPv4 and/or IPv6 addresses, device name, Domain Name Server (DNS); NETBIOS and/or SNMP, etc.

Network test instrument 200 includes a user interface 250 enabling a user to interact with the network test instrument 200, and to operate the instrument 200 and obtain data therefrom, whether at the location of installation or remotely from the physical location of network attachment. Network test instrument 200 preferably includes hardware and software, CPU, memory, interfaces and the like to operate, connect to, monitor and acquire network device 10, 12, 14 on the network 100, as well as performing various testing and measurement operations, transmitting and receiving data and the like. One or more instruments 200 may be operating at various locations on the network 100, providing measurement data at the various locations, which may be forwarded and/or stored for analysis. Network test instrument 200 preferably includes a software driven analysis engine 22 which acquires diagnostic information from network devices 10,12, 14, via either wirelessly 30 (e.g., 802.11) or wired 32 (e.g., 802.3), and preferably stores data received via a wireless connection 30 in a first database/memory location 260 for wireless (e.g., 802.11) captured data, and preferably stores data received via a wired connection 32 in a second database/memory location 270 for wired (e.g., 802.3) captured data.

Figure 2B:
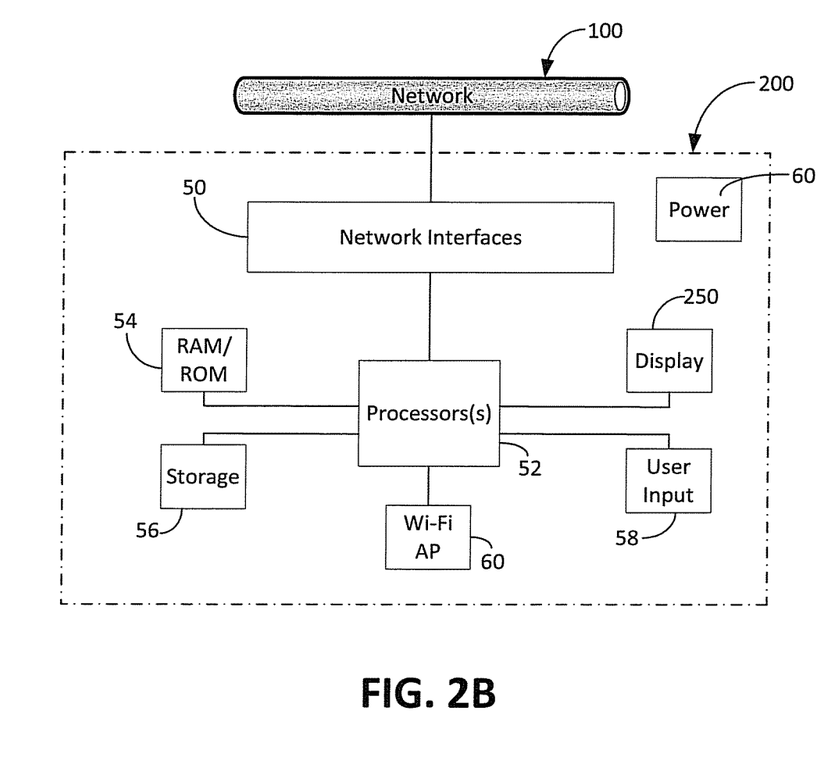
FIG. 2B depicts a block diagram of a test instrument used in the system of FIG. 1.

With reference now to FIG. 2B, shown is a block diagram of a test instrument/analyzer 200 in accordance with an illustrated embodiment, wherein the instrument 200 may include network interfaces 50 which attach the instrument 200 to a network 100 via multiple ports. Instrument 200 further preferably includes: one or more processors 52 for operating the instrument 200; memory such as RAM/ROM 54 (e.g., databases 260, 270); persistent storage 56; GUI display 250 user input devices 58 (such as, for example, keyboard, mouse or other pointing devices, touch screen, etc.); power supply 60 which may include battery or AC power supplies; a Wi-Fi transceiver 60 which wirelessly (e.g., via 802.11) attaches instrument 200 to network 100 and other external devices.

For instance, network test instrument 200 may be utilized with the OneTouch™ AT Network Assistant handheld instrument provided by Fluke Networks®, as shown in FIG. 2A. The OneTouch™ AT Network Assistant 200 is essentially an all-in-one Gigabit Ethernet diagnostic instrument adapted and configured for copper, fiber optic and Wi-Fi networks. Operational aspects can be found in commonly assigned U.S. Pat. No. 5,919,248 (filed Mar. 25, 1997) and U.S. Pat. No. 6,064,372 (filed Nov. 27, 1996), and U.S. Patent Publication Nos.: 2012/0291115 (filed May 12, 2011) and 2013/0046809, all of which are incorporated herein by reference in their entirety.

Essentially, instrument 200 provides a client view (via GUI 250) of network performance enabling a user to expeditiously troubleshoot and solve problems. Certain operational and functional features of network test instrument 200 include (and are not limited to): an integrated Ethernet tester for copper, fiber optic and Wi-Fi in which instrument 200 preferably includes multiple 10/100/1000 Mbps RJ-45 Ethernet test ports, multiple 100/1000 Mbps SFP fiber optic transceiver ports and an internal 802.11 a/b/g/n dual band radio to simultaneously test wired Ethernet and wireless Wi-Fi networks. Instrument 200 is adapted and operational to conduct wired network analysis whereby instrument 200 provides automated discovery of copper and fiber-connected devices (e.g., 10, 12) and key device attributes to enable sorting by attributes to obtain multiple views into the wired network 100. For example, sort by IPv4 or IPv6 address to identify used and available addresses. Instrument 200 is adapted and operational to conduct Wi-Fi network analysis whereby instrument 200 provides automated discovery of Wi-Fi devices (e.g., 12, 14) and key device attributes to enable sorting by attributes to obtain multiple views into the wireless network 100. For example, sort by signal strength to troubleshoot Wi-Fi coverage issues. Sort by MAC manufacturer to discover Wi-Fi devices (e.g., 10, 14) by type, sort by channel to identify channel spacing problems and sort by authorization status to find potential security violations.

Figure 4:
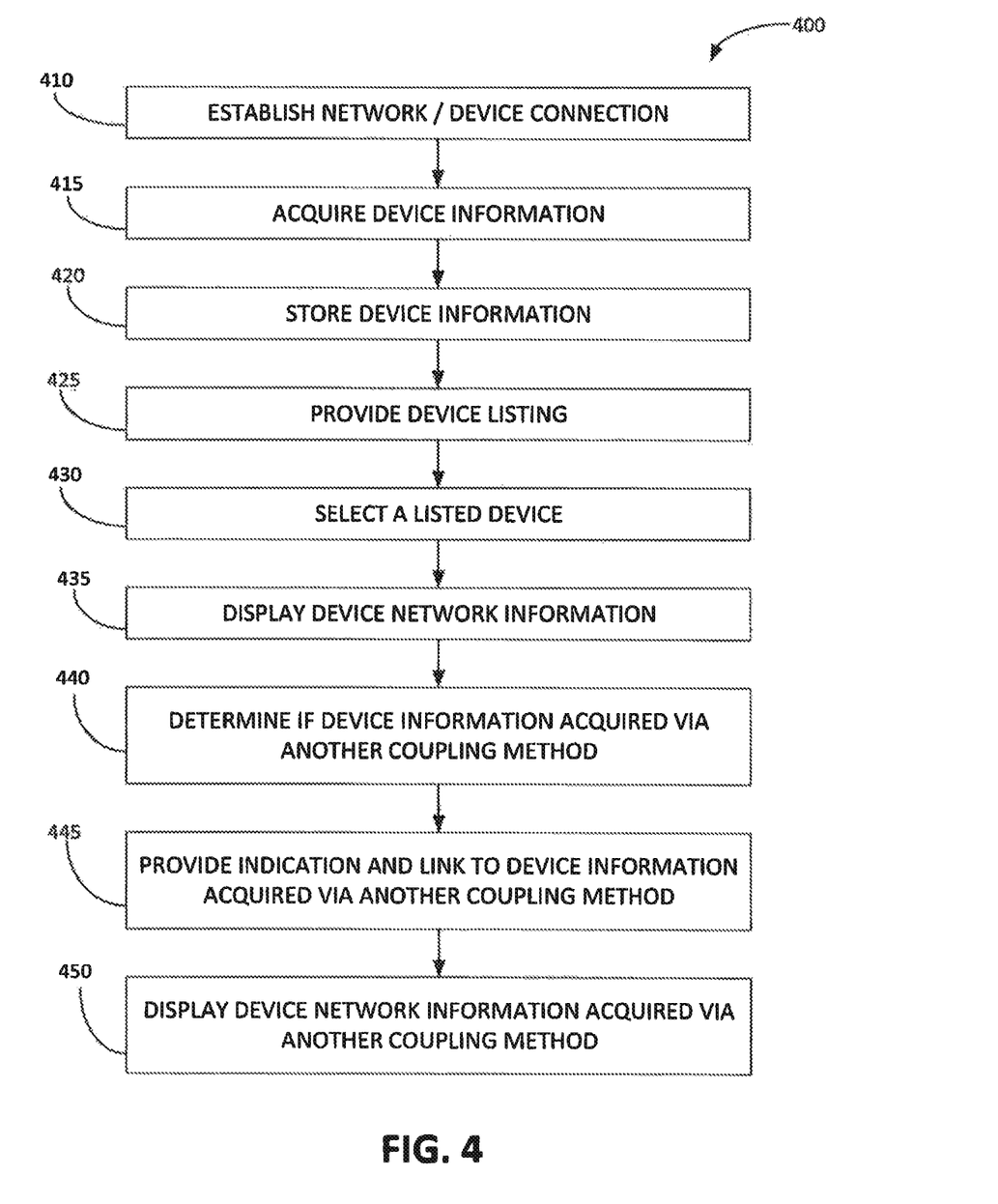
FIG. 4 is a flowchart of operational steps of a test instrument used in the system of FIG. 1.

With reference now to FIG. 4, and with the system components described above, a method of operation 400 for instrument 200 will now be discussed in accordance with certain illustrated embodiments for instrument 200. It is noted that the order of steps shown in FIG. 4 for method 400 is not required, so in principle, the various steps may be performed out of the illustrated order. Also certain steps may be skipped, different steps may be added or substituted, or selected steps or groups of steps may be performed in a separate application following the embodiments described herein.

Starting at step 410, a illustrative method of operation (referenced generally by numeral 400) of instrument 200 includes establishing a data connection between instrument 200 and each device (10, 12, 14, etc.,) connected to a network 100 via either one or both of a wireless connection (e.g., via a 802.11 connection) and/or a wired connection (e.g., via a 802.3 connection) to the network 100. Once a connection is established between instrument 200 and a network device (e.g., device 10), instrument 200 is adapted and configured to acquire device information pertinent to its connection method, step 415. For instance, information acquired via a wireless (e.g., 802.11) connection to device 10 will results in capture of information available wirelessly including for instance (but not limited to) the aforesaid layer 1 and 2 device information. Similarly, information acquired via a wired (e.g., 802.3) connection to device 10 will results in capture of information available via a wired connection, including for instance (but not limited to) the aforesaid Layer 2 and 3 device information.

Next, in step 420, device 10 information acquired via a wireless connection (e.g., 802.11) is preferably stored in a first memory location (e.g., database 260) for information captured wirelessly, and information acquired via a wired connection (e.g., 802.3) is preferably stored in a second memory location (e.g., database 270) for wired captured information. If information for a device (e.g., device 10) is acquired by instrument 200 both wirelessly (e.g., 802.11) and by wire (e.g., 802.3), then the wirelessly captured information is stored in the aforesaid first memory location (e.g., database 260) for wirelessly captured information and the wired captured information is stored in the aforesaid second memory location (e.g., database 270) for wired captured information. Preferably, the aforesaid device information is stored in both the wireless memory location/database (260) and the wired memory location/database (270) in accordance with a selected MAC address for a given device (e.g., device 10). It is to be understood a Media Access Control address (MAC address) is a uniquely identifying network address assigned to network interfaces for communications on a physical network, (e.g., network 100). Typically, MAC addresses are used for numerous network technologies and IEEE 802 network technologies, including Ethernet. MAC addresses are typically used in the media access control protocol sublayer of the Open System Interconnection (OSI) reference model.

It is to be appreciated that determining whether devices in the wired and wireless databases are the same device requires preparation and analysis in both databases. The wired database preferably uses SNMP, ARP, NetBEUI, ICMP, and other protocols to elicit as much information as possible about each device. This act of sending queries and receiving answers is called "Active Discovery" because devices are being actively communicated with on the network. Through the information gained by active discovery, the wired database can determine whether a device has multiple MAC addresses and/or IP addresses.

The wireless database is populated primarily by listening to network packets (as opposed to actively communicating with devices to elicit information). This listening method of gathering information is termed "Passive Discovery". The wireless database preferably uses a matching technique algorithm to determine whether two different wireless MAC addresses are actually the same device.

It is noted both the wired and wireless databases use Active and Passive discovery, but wireless uses primarily Passive and wired uses primarily Active. Additionally, both the wired and wireless databases can merge multiple MAC addresses into a single device, or in other words, devices can have multiple MAC addresses. Additionally, it is to be appreciated that both the wired and wireless databases can determine the IP address(es) of devices.

In operation, control logic assumes that if any of the multiple MAC addresses of a device in one database matches any of the multiple addresses of one device in the other database means that the two devices are in fact the same device. It is further assumed that if any of the multiple MAC addresses of a device in the wired database matches any of the multiple addresses of one device in the wireless database using the aforesaid matching technique mentioned above, this is indicative that the two devices are the same device.

It is additionally assumed that any of the multiple IP addresses of a device in one database matching any of the multiple IP addresses of one device in the other database is indicative that the two devices are likely the same device. The reason that IP addresses only lead to a likelihood of a matching device is because some wireless devices actually share an IP address, and further confirmation is required to verify the match—which confirmation can come through SNMP queries.

Instrument 200 is further operational and functional, via its GUI (250), to provide a listing of network devices (e.g., 10, 12) discovered via a wired network connection (FIG. 3A), or upon user preference, a listing of network devices (e.g., 10, 14) discovered via a wireless network connection (FIG. 3B), step 425. Once the user selects which aforesaid device listing to view (e.g., the listing of devices captured via a wired connection—FIG. 3A), a user preferably selects a listed device (e.g., device 10), step 430. The network/captured information relating to that selected device (e.g., device 10) is then retrieved from the appropriate wired or wirelessly captured memory location/database (e.g., database 270 for wired captured information) and is displayed to the user via the instrument GUI 250 (e.g., window segment 300 of FIG. 3A), step 435.

Preferably, upon the aforesaid device selection of step 435, instrument 200 determines if information was also captured for the selected device (e.g., device 10) via the other connection method (e.g., wireless), step 440. Preferably, and in accordance with an illustrated embodiment, this is accomplished by instrument 200 through determining if a matching MAC address for the selected device (e.g., device 10) (step 430) is used to store information in the other memory location/database (e.g., database 260 for wireless captured information) by querying said other memory location/database (e.g., database 260). If yes, (e.g., a matching MAC address is found in the other memory location/database) then this is indicative that device/network information for the selected device (step 430) (e.g., device 10) was captured both via a wired and wireless connection with instrument 200, and indication is presented in the GUI 250 (e.g., symbols 310, 360) indicating information was also captured via the other connection method for the selected device (e.g., device 10), step 445. User selection of this indication (e.g., symbol 310) causes instrument 200 to retrieve the network/captured information relating to the selected device (e.g., device 10) from the memory/database (e.g., database 260 for wireless captured information) relating to this other (e.g., wireless) connection method so as to then be displayed via the instrument GUI 250 (e.g., window segment 350 of FIG. 3B), step 450. It is noted this GUI display (e.g., window 350) also provides indication (e.g., symbol 360) indicating information was captured via the other connection method (e.g., wired connection) for the selected device (e.g., device 10), whereupon user selection of this indication (e.g., symbol 360) causes instrument 200 to retrieve the network/captured information relating to the selected device (e.g., device 10) from the memory/database (e.g., database 270 for wireless captured information) relating to this other (e.g., wired) connection method.

For instance, if wireless discovery details window 350 (FIG. 3B) for a specific 802.11 device 10 is displayed, selection of the cross link filter button/indication 360 pushes the 802.11 discovery details window 350 down on GUI 250 of instrument 200 and raises the wired discovery details window 310 (FIG. 3A) on GUI 250 on instrument 200 for the same device 10. Selection of a cross link button/indication 310 on the wired discovery details window 300 then restores the original wireless discovery widow 350 details view (FIG. 3B).

Optional embodiments of the above illustrated embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. The above presents a description of a best mode contemplated for carrying out illustrated embodiments and of the manner and process of making and using it in such full, clear, concise, and exact terms as to enable any person skilled in the art to which it pertains to make and use/practice the illustrated embodiments. The illustrated embodiments are, however, susceptible to modifications and alternative method steps from those discussed above that are fully equivalent. Consequently, they are not limited to the particular embodiments disclosed. On the contrary, the illustrated embodiments encompass all modifications and alternative constructions and methods coming within the spirit and scope of the present invention.

What is claimed is:

1. A method for presenting network diagnostic information for network devices in a test network comprising:
   presenting in a GUI of a network test instrument acquired network diagnostic information for a network device wherein the presented network diagnostic information is acquired via a first wired network connection with the network test instrument, wherein the diagnostic information of a network device includes at least one of a test network connection link information, a nearest switch or access port (AP), a response time of gateway tests, and a response time of server connectivity tests;
   providing indication that is user selectable in the GUI that network diagnostic information for the network device was also acquired via a first wireless network connection with the network test instrument, and presenting in the GUI of the network test instrument acquired wireless network diagnostic information for the network device when the user selects the indication provided in the GUI that network diagnostic information for the network device was also acquired via the first wireless network connection such that the GUI toggles between presenting wireless network diagnostic information and wired network diagnostic information for the network device upon user selection of the indication provided in the GUI.

2. The method recited in claim 1 further including:
presenting in a GUI of a network diagnostic instrument a listing of network devices; and
determining if network diagnostic information for a device selected from the listing of network devices was acquired via the first wireless network connection when the device is selected from the listing of network devices discovered via the first wired network connection method.

3. The method as recited in claim 1 wherein at least a portion of the network diagnostic information acquired via the first wireless network connection is different than that acquired via the first wired network connection for a selected network device.

4. The method as recited in claim 1 wherein the acquired network diagnostic information for the first wireless connection comprises Wi-Fi captured layer 1 and layer 2 information.

5. The method as recited in claim 1 wherein the acquired network diagnostic information for the first wired connection comprises wired captured layer 2 and layer 3 information.

6. The method as recited in claim 1 wherein the network diagnostic test instrument comprises:
a first memory location for storing network device information acquired via the first wireless network connection between the network diagnostic instrument and each wireless network device; and
a second memory location for storing network device information acquired via the first wired network connection between the network diagnostic instrument and each wired network device.

7. The method as recited in claim 6, wherein each network device is identified in both the first and second memory location according to a same device MAC address.

8. The method recited in claim 1 wherein the diagnostic information of a network device includes a dynamic host configuration protocol (DHCP) address.

9. A handheld apparatus having a Graphical User Interface (GUI) for acquiring network device information from both a wired and wireless connection to network devices in a test network comprising:
at least one network port for establishing a wired connection to the network devices of the test network;
at least one wireless network interface for establishing a wireless connection to the network devices of the test network;
a processor coupled to the network port and wireless network interface, the processor adapted to execute one or more processes; and
a memory configured to store a instructions executable by the processor, the instructions, when executed by the processor, cause the processor to:
present in the GUI acquired network diagnostic information for a network device selected from a listing of network devices wherein the indicated network diagnostic information is acquired via a first wired network connection, wherein the diagnostic information of a network device includes at least one of a test network connection link information, a nearest switch or access port (AP), a response time of gateway tests, and a response time of server connectivity tests;
provide indication that is user selectable in the GUI that network diagnostic information for the selected network device was also acquired via a first wireless network connection between the apparatus and the test network; and
present in the GUI of the network test instrument acquired wireless network diagnostic information for the network device when the user selects the indication provided in the GUI that network diagnostic information for the network device was also acquired via a second wireless network connection such that the GUI toggles between presenting wireless network diagnostic information and wired network diagnostic information for the network device upon user selection of the indication provided in the GUI.

10. The apparatus recited in claim 9 further including instructions for causing the processor to determine if network diagnostic information for the selected device was acquired via the second wireless network connection when the network device is selected from the listing of network devices discovered via the first wired connection method.

11. The apparatus recited in claim 9 wherein the wireless connection comprises IEEE 802.11 over-the-air modulation techniques for connecting the apparatus to the test network and the wired connection comprises IEEE 802.3 physical connection techniques for connecting the network diagnostic instrument to the network devices.

12. The apparatus recited in claim 11 wherein the acquired network diagnostic information from the wireless connection comprises Wi-Fi captured layer 1 and layer 2 information.

13. The apparatus recited in claim 12 wherein the acquired network diagnostic information from the wired connection comprises wired captured layer 2 and layer 3 information.

14. The apparatus recited in claim 13 wherein the network diagnostic test instrument comprises:
a first memory location for storing network device information acquired via the wireless connection between the network diagnostic instrument and each network device; and
a second memory location for storing network device information acquired via the wired connection between the network diagnostic instrument and each network device.

15. The apparatus recited in claim 14, wherein a network device is identified in both the first and second memory according to a same device MAC address.

16. The apparatus recited in claim 9 wherein at least a portion of the network diagnostic information acquired via the wireless connection is different than that acquired via the wired connection for a selected network device.

17. A graphical user interface for a handheld test instrument, comprising:
a graphical display having a touchscreen interface;
a listing of network devices on the graphical display indicating each network device has network device diagnostic information acquired via a first wired network connection to the handheld test, wherein the diagnostic information of a network device includes at least one of a test network connection link information, a nearest switch or access port (AP), a response time of gateway tests, and a response time of server connectivity tests;

an indicator that is user selectable on the graphical display indicating that network device diagnostic information for a selected network device from the listing of network devices was also acquired via a first wireless network connection to the selected network device such that the graphical display toggles between presenting wireless network diagnostic information and wired network diagnostic information for a network device upon user selection of the indication provided in the GUI.

\* \* \* \* \*